(12) United States Patent
O'Connor

(10) Patent No.: US 10,904,390 B1
(45) Date of Patent: Jan. 26, 2021

(54) METHOD OF INTEGRATING ARTIFICIAL INTELLIGENCE SYSTEMS TO DYNAMICALLY ADJUST WRAP-UP TIME

(71) Applicant: Avaya Management L.P., Santa Clara, CA (US)

(72) Inventor: Neil O'Connor, Athenry (IE)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/917,438

(22) Filed: Jun. 30, 2020

(51) Int. Cl.
*H04M 3/523* (2006.01)
(52) U.S. Cl.
CPC ................................ *H04M 3/5238* (2013.01)
(58) Field of Classification Search
None
See application file for complete search history.

(56) References Cited

U.S. PATENT DOCUMENTS

| | | | |
|---|---|---|---|
| 6,563,920 B1* | 5/2003 | Flockhart | H04M 3/5233 379/265.01 |
| 2005/0100159 A1* | 5/2005 | Fink | H04M 3/5191 379/265.11 |
| 2006/0221941 A1 | 10/2006 | Kishinsky et al. | |
| 2006/0239440 A1* | 10/2006 | Shaffer | H04M 3/523 379/265.02 |

OTHER PUBLICATIONS

"Twilio TaskRouter Worker Resource," Twilio Inc., 2020, 18 pages [retrieved online from: www.twilio.com/docs/taskrouter/api/worker#update-a-worker-resource].

* cited by examiner

*Primary Examiner* — Nafiz E Hoque
(74) *Attorney, Agent, or Firm* — Sheridan Ross P.C.

(57) ABSTRACT

The present disclosure provides, among other things, a method of managing a wrap-up time in a contact center, the method including: receiving, by an agent of the contact center, a communication having a variable associated with the communication; receiving an input from a source external to the contact center; determining that the variable is related to the input; based on the relation of the variable to the input, determining an updated wrap-up time; storing the updated wrap-up time and the input in a database including timing variables; enabling a machine learning process to analyze the database; providing the updated wrap-up time to the agent as an amount of time rendered on a display to the agent; and updating a data model used to automatically determine wrap-up times based on the analysis of the machine learning process.

20 Claims, 6 Drawing Sheets

METHOD OF INTEGRATING ARTIFICIAL INTELLIGENCE SYSTEMS TO DYNAMICALLY ADJUST WRAP-UP TIME

FIELD

Embodiments of the present disclosure relate generally to communication methods and specifically to managing agent states in a contact center deploying an Automated Call Distribution (ACD) system.

BACKGROUND

The contact center is a hub of communications between business and customers, connecting over multiple channels to facilitate sales and support to deliver the best possible customer service. An efficient contact center will improve the performance of the agents to deliver a prompt and informed service.

BRIEF SUMMARY

In the modern contact center, the process to connect customers to agents in communication sessions is based on matching the properties of the incoming communication with skills of one or more agents. Agents that have been trained and have expertise in certain areas are assigned to groups, called skillsets, which align with their expertise and/or knowledge base. When a communication arrives into the contact center it is automatically analyzed for various properties and automatically assigned to a skillset and routed onward to a selected agent. After a contact center communication ends, the agent engaged in the communication has a fixed amount of wrap-up time. The wrap-up time affords the agent time to perform needed work. Such need work can include updating IT systems and applications whether internal or external to the contact center, entering notes regarding the communication, handling any problems with the communication, discussing the communication with a supervisor, etc. Wrap-up times are typically set based on a static rule, such as a certain amount of time for each type of queue into which the communication was sorted, and the wrap-up time does not vary from what is statically set. However, resources of the contact center are wasted when wrap-up times do not accurately reflect actual amounts of time needed by agents to perform their needed post-communication work. Thus, there is a need for systems and methods to improve how wrap-up time is determined and implemented.

In embodiments disclosed herein, an amount of wrap-up time can be determined by a source external to the contact center and then dynamically injected into the contact center application. It can be advantageous to have an external source determining desired updates to wrap-up times because amounts of time needed for wrap-up times can often be influenced by variables that are external to the contact center, which can be considered by the external source. Such external factors cannot be considered by an algorithm running within the contact center.

In various embodiments, systems and methods disclosed herein may consume data that is internal to the contact center (referred to herein as internal information) and that is external to the contact center (referred to herein as external information).

Examples of external information include, but are not limited to, public or private business rules and business data (e.g., rules and data from one or more businesses that are separate entities (e.g., from a legal standpoint or a customer viewpoint) from the contact center). The external information may include instructions on how actions related to a business, including actions related to customers of a business, should be performed (e.g., how to handle communications, how to comply with legal requirements, how to document business data, etc.). The external information may be Customer Relationship Management (CRM) data that provides information about a customer's history, preferences, etc. The external information may be obtained from databases, from surveys, from references (including articles, books, magazines, directories, search engines, and records), and from people (including customers, users, associates, and vendors), among other sources. In various embodiments, external information may be related to, or the same as, internal information.

The systems and methods disclosed herein may dynamically calculate a value for wrap-up time by considering the data, where the value for the wrap-up time is an updated wrap-up time that is pushed into the contact center application, and the contact center may assume the updated wrap-up time and apply it to communications as needed. The wrap-up times can be applied to communications in-progress, new communications, and different types of communications.

Examples of internal information within the contact center that can be considered, together or separately from external information (e.g., data that is external to the contact center) includes but is not limited to call recordings, communication transcripts, customer histories, and agent reports. Internal information may be obtained from databases maintained by the contact center, from information collected within the contact center or from contact center interactions, and from other business rules and business data of the contact center. This internal information advantageously constitutes a valuable resource that can enable improvements to the methods and systems of the contact center because the updated wrap-up times can help to better the customer experience and improve contact center processing and routing efficiency.

Agents may have a control on their display that conveys various information, including information about one or more current communication sessions. In some embodiments, agents can see the control change state (and change the visual indication of the control) to indicate the wrap-up time and a timer may be displayed. However, the agent may extend or adjust the wrap-up time and/or call for a supervisor or administrator (also referred to herein as a "violation" of the wrap-up time). Wrap-up time is a state where the agent is not in a communication but is also not being considered for assignment to a new communication (e.g., the agent state would be "available"). The number of times that an agent adjusts the wrap-up time (e.g., incurs violations) may be summarized for review and consideration in metrics of the contact center. Thus, having a more accurate determination of wrap-up times can reduce cost and improve performance of contact centers because it will reduce the amount of times that an agent violates the wrap-up time, and thereby reduce the amount of time and resources required to handle the violations, including reducing the amount of time and resources required for administrative tasks such as review and oversight.

In some embodiments, the determination of an amount of wrap-up time could be a one-time determination, and in other embodiments, the determination of wrap-up time could be a continuous determination (e.g., the wrap-up time would be determined multiple times during the course of the communication as the communication is in-progress, or multiple times during the course of the contact center operations as the operations are in-progress).

The system for determining wrap-up time, although it may be external to the contact center, is not limited to consuming information that is only external to the contact center. Multiple feeds could be considered, such as news feeds, real-time media streams, a video feed of the face of the customer, human resource system data, training or performance system data, etc. Internal information can also be used and may be used in combination with external information. An example of internal information of the contact center includes if an agent is a trainee, then the wrap-up engine could consider this information in determining a wrap-up time. Also, conditional rules may be implemented so that if the agent is a trainee and if contact center is quiet and a supervisor of the agent has free time, then the wrap-up time could be updated to extend the wrap-up time.

Embodiments of the present disclosure describe an automated solution that permits real-time insights from Artificial Intelligence ("AI") applications, and other sources, to adjust the desired wrap-up time for a communication session, right up to and including the time the communication session is terminated.

Embodiments of the present disclosure may also permit an expansion of the information used to determine wrap-up time. Thus, instead of being limited to only a label on the queue (e.g. a queue named "support" has a statically set wrap-up time of 90 seconds), the present embodiments advantageously describe systems and methods for new information to be included in the determination of wrap-up time. Such information includes, for example, one or more of detected sentiment, trends in agent performance for customers of a certain personality type, and degree of disparity between predicted versus actual outcome of an engagement, among others.

Embodiments of the present disclosure can allow wrap-up time to become an event-based data item that can be determined in real-time and can be exposed to authorized applications in order to influence adjustments to the wrap-up time. This allows the use of an appropriate processing time for agents to perform work related to handling customer engagements instead of the wrap-up time being only a manually-configured data item on a pre-existing, fixed entity of the contact center data model.

Embodiments of the present disclosure can improve contact center performance against key performance metrics by changing how wrap-up time is implemented (e.g., from a static set value to a dynamically determined value that may be set at any time, including in real-time during a communication session). This is advantageous because some engagements may not need as much time for wrap-up as is typically provided; however, other engagements may need additional time to properly implement wrap-up timing. Data mining and machine learning tools and techniques can discover properties about the communication session that can inform an improved wrap-up time for each customer communication session.

Improved wrap-up times (e.g., more accurate values of wrap-up times for each communication session) will contribute to improvements in the contact center processing efficiency and will minimize unnecessary utilization of contact center resources, including hardware. Furthermore, improvements in handling wrap-up times (e.g., fewer wrap-up time violations) will improve staff and resource utilization from a reduction in the violations.

According to some aspects of the present disclosure, a method of managing a wrap-up time in a contact center includes: receiving, by an agent of the contact center, a communication having a variable associated with the communication; receiving an input from a source external to the contact center; determining that the variable is related to the input; based on the relation of the variable to the input, determining an updated wrap-up time; storing the updated wrap-up time and the input in a database including timing variables; enabling a machine learning process to analyze the database; providing the updated wrap-up time to the agent as an amount of time rendered on a display to the agent; and updating a data model used to automatically determine wrap-up times based on the analysis of the machine learning process.

Another aspect of the present disclosure is that the method further includes: receiving input from the agent during the wrap-up time, where the receiving the input includes at least one of storing a result and automatically reporting a result; and displaying an end of the updated wrap-up time to the agent.

In some embodiments, the input from the external source is received during the communication.

In some embodiments, the machine learning process retrieves data related to the variable from the timing variables database, and where the updated wrap-up time is based on the data.

In some embodiments, the machine learning process performs an analysis of a sentiment contained in the communication.

In some embodiments, the data model is used to automatically classify communications, and the method further includes providing a second updated wrap-up time to an agent associated with a second communication based on the automatic classification and the input, where the second updated wrap-up time is a second amount of time rendered on the display to the agent.

In some embodiments, the variable changes during the communication and the machine learning process performs the analysis over a timeframe that includes the changes in the variable.

In some embodiments, the updated wrap-up time is determined based on a rule of the contact center considered in combination with the analysis by the machine learning process.

Another aspect of the present disclosure is that the method further includes: receiving a secondary input from a second source external to the contact center, where the second source is one of a news feed, a social media feed, and a business rule, and where the updated wrap-up time is determined by the machine learning process and based on both of the input and the secondary input.

In some embodiments, the machine learning process analyzes the database to obtain the input before a start of the communication.

According to some aspects of the present disclosure, a communication system includes: a processor; and computer memory storing data thereon that enables the processor to: receive, by an agent of the contact center, a communication having a variable associated with the communication; receive an input from a source external to the contact center; determine that the variable is related to the input; based on the relation of the variable to the input, determine an updated wrap-up time; store the updated wrap-up time and the input in a database including timing variables; enable a machine learning process to analyze the database; provide the updated wrap-up time to the agent as an amount of time rendered on a display to the agent; and update a data model used to automatically determine wrap-up times based on the analysis of the machine learning process.

In some embodiments, the processor is further enabled to receive input from the agent during the wrap-up time, where the receiving the input includes at least one of storing a result and automatically reporting a result.

In some embodiments, the input from the external source is received during the communication.

In some embodiments, the machine learning process retrieves data related to the variable from the timing variables database, where the updated wrap-up time is based on the data.

In some embodiments, the machine learning process is further enabled to determine the updated wrap-up time based on a sentiment contained in the communication.

In some embodiments, the data model is used to automatically classify communications, and the processor is further enabled to provide a second updated wrap-up time to an agent associated with a second communication based on the automatic classification and the input.

In some embodiments, the processor is further enabled to invoke a reporting function when the updated wrap-up time is provided to the agent or when the data model is updated.

In some embodiments, the updated wrap-up time is determined based on a rule of the contact center considered in combination with the analysis by the machine learning process.

In some embodiments, the processor is further enabled to receive a secondary input from a second source external to the contact center, where the second source is one of a news feed, a social media feed, and a business rule, and where the updated wrap-up time is determined by the machine learning process and based on both of the input and the secondary input.

According to some aspects of the present disclosure, a contact center includes: a server including a processor and a wrap-up timing engine that is executable by the processor and that enables the processor to: receive, by an agent of the contact center, a communication having a variable associated with the communication; receive an input from a source external to the contact center; determine that the variable is related to the input; based on the relation of the variable to the input, determine an updated wrap-up time; store the updated wrap-up time and the input in a database including timing variables; enable a machine learning process to analyze the database; provide the updated wrap-up time to the agent as an amount of time rendered on a display to the agent; and update a data model used to automatically determine wrap-up times based on the analysis of the machine learning process.

As used herein, a communication may also be referred to as an "engagement," a "message," and a "communication session" and may include one or multiple electronic records, text, rich media, or data structures that are transmitted from one communication device to another communication device via a communication network. A communication may be transmitted via one or more data packets and the formatting of such data packets may depend upon the messaging protocol used for transmitting the electronic records over the communication network.

As used herein, an agent state or state of an agent may include one or more of an AVAILABLE state, an OCCUPIED state, a BUSY state, an AFTER-CALL WORK (ACW) state also referred to as a TIMED AFTER-CALL WORK (TACW) state or a wrap-up time, an UNAVAILABLE state, or any other agent state known or yet to be developed for use in a contact center.

As used herein, a data model may correspond to a data set that is useable in an artificial neural network and that has been trained by one or more data sets that describe conversations or message exchanges between two or more entities. The data model may be stored as a model data file or any other data structure that is useable within a neural network or an Artificial Intelligence (AI) system.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Illustrative hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or contact center is contemplated to include finite instruction sets and/or artificial intelligence-based models/neural networks to perform some or all of the steps described herein.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides illustrative embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the illustrative embodiments will provide those skilled in the art with an enabling description for implementing an illustrative embodiment. It should however be appreciated that the present disclosure may be practiced in a variety of ways beyond the specific detail set forth herein.

While the illustrative aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Embodiments of the disclosure provide systems and methods for machine learning tools to support determinations of wrap-up times within a contact center. Embodiments of the present disclosure are also contemplated to automatically update wrap-up time, as appropriate, based on an analysis of external and/or internal information.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
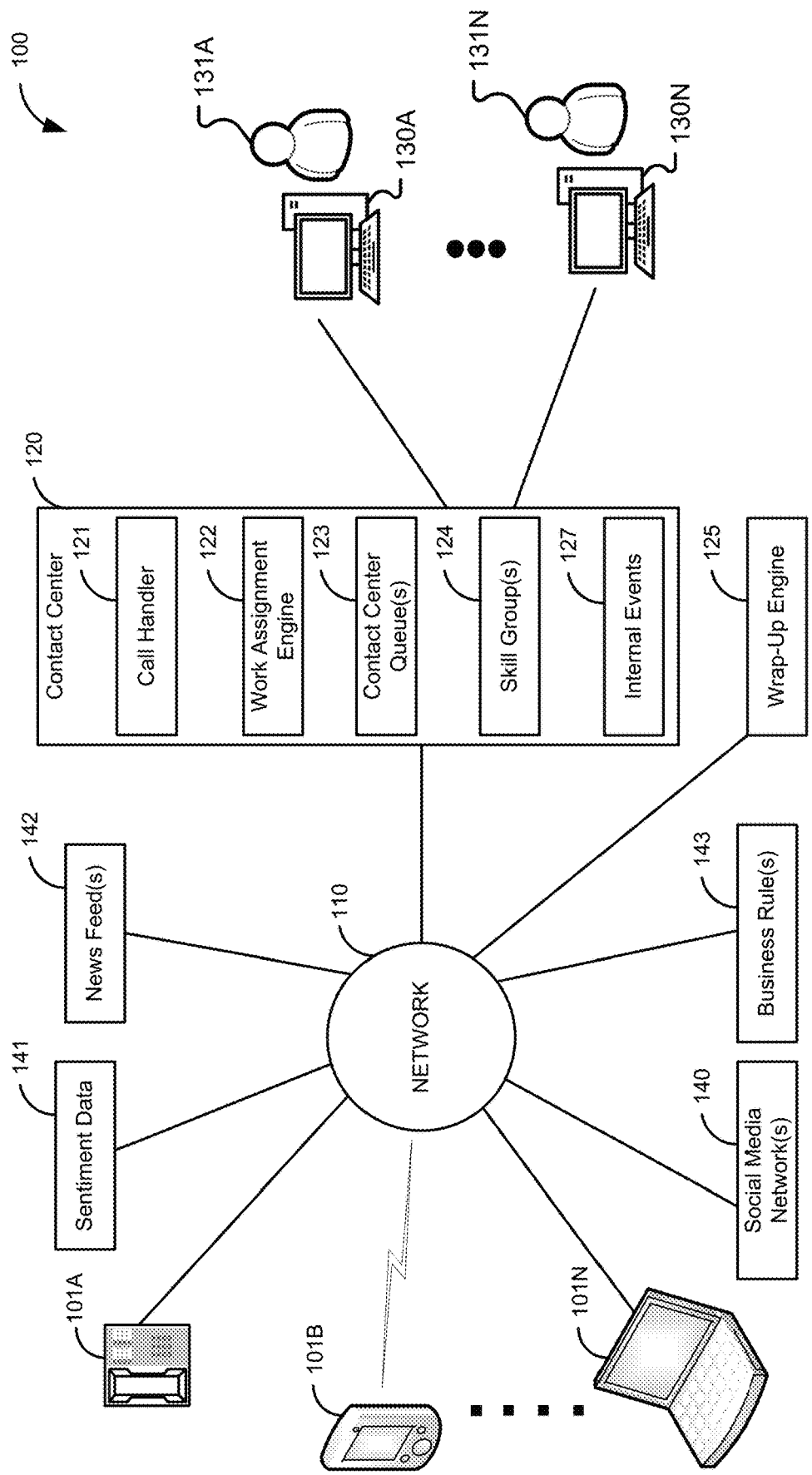
FIG. 1 is a block diagram illustrating a communication system in accordance with at least some embodiments of the present disclosure.

Referring initially to FIG. 1, a block diagram illustrating a communication system 100 in accordance with at least some embodiments of the present disclosure is shown. The first illustrative system 100 comprises communication endpoints 101A-101N, a network 110, the contact center 120, agent terminals 130A-130N, social media network(s) 140, sentiment data 141, news feed(s) 142, business rule(s) 143, and wrap-up engine 143. The contact center 120 typically also has contact center agents (human agents) 131A-131N that service communications in the contact center 120. Although the terms "communication(s)" and communication session(s)" may be used interchangeably herein, a communication session may include multiple communications (e.g., the communications of the communication session may be related by a common user, a common endpoint, etc.). Various components of FIG. 1 are stored on one or more memory devices (not shown).

Memory of the system 100 may include one or multiple computer memory devices. The memory may be configured to store program instructions that are executable by one or more processors (not shown) and that ultimately provide functionality of the systems described herein. The memory may also be configured to store data or information that is useable or capable of being called by the instructions stored in memory. The memory may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory, in some embodiments, corresponds to a computer-readable storage media and the memory may correspond to a memory device, database, or appliance that is internal or external to the contact center 120.

The communication endpoints 101A-101N may correspond to a computing device, a personal communication device, a portable communication device, a laptop, a smartphone, a personal computer, and/or any other device capable of running an operating system, a web browser, or the like. For instance, communication endpoints 101A-101N may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication endpoints 101A-101N may also have any of a variety of applications, including for example, a database client and/or server applications, web browser applications, chat applications, social media applications, calling applications, etc. A communication endpoint 101A-101N may alternatively or additionally be any other electronic device, such as a thin-client computer, Internet-enabled mobile telephone, and/or personal digital assistant, capable of communicating via communication network 110 and/or displaying and navigating web pages or other types of electronic documents.

As shown in FIG. 1, any number of communication endpoints 101A-101N may be connected to the network 110. Users (not shown) of the communication endpoints 101A-101N interact with their communication endpoints 101A-101N to communicate with a resource (e.g., agents 131A-131N) of the contact center 120. For example, the contact center 120 may include a number of resources that facilitate user (also referred to herein as customer) interactions via one or multiple communication channels that are presented to and maintained for use by the customers and one or more of their communication endpoints 101A-101N. A customer may utilize one or multiple of the communication endpoints 101A-101N to interact with the contact center. Alternatively or additionally, a customer may use one of their communication endpoints 101A-101N to send different types of messages (e.g., email, chat, SMS, etc.) to the contact center 120 and/or to communicate with the contact center 120 via a voice channel.

The network 110 can be any type of network familiar to those skilled in the art that can support data communications using any of a variety of commercially-available protocols, including without limitation SIP, TCP/IP, SNA, IPX, AppleTalk, and the like. By way of example, network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), H.323, video protocols, email protocols, cellular protocols, Instant Messaging (IM) protocol, and/or the like. Thus, the network 110 is an electronic communication network 110 configured to carry electronic messages via packets and/or circuit switched communications.

The network 110 can communicate with one or more systems that are external to the contact center 120. For example, the network 110 can communicate with social media network(s) 140, sentiment data 141, news feed(s) 142, business rule(s) 143, and/or wrap-up engine 125. The social media network(s) 140 can be or may include various kinds of social media networks 140, such as Facebook®, Twitter®, Linkedin®, a business social media network, an online forum, and/or the like. The sentiment data 141 can be or may include any type of sentiment data, such as image (e.g., facial image, body image, video image) classification data, text (e.g., phrase, key word, etc.) classification data, natural language processing rules, linguistic information, biometrics, and/or the like. The news feed(s) 142 can be or may include various type of news feeds 142, including printed, audio, and/or video news feeds 142. The news feeds 142 can include various news sources, such as ABC News®, Yahoo News®, Google News®, Reuters®, ESPN®, RSS feeds, and/or the like. The business rule(s) 143 can be or may include any types of rules related to one or more businesses or units of a business. For example, business rules can define structure to operations, people, processes, business behavior, and/or computing systems in an organization, and the like.

The contact center 120 is shown to include one or more computing devices (e.g., terminals 130A-130N) that enable a contact center agent 131A-131N to interact with a customer via one or more communication channels established between the communication endpoint 101A-101N and the contact center 120. The contact center 120 can be or may include any hardware coupled with software that can manage communications (incoming and/or outgoing) that are routed to and/or from agents 131A-131N. For example, the contact center 120 can include a network border device (not shown) and a number of servers (not shown) that enable functionality of the contact center 120. In some embodiments, each server of the contact center 120 may be configured to perform a particular task or a set of tasks specific to supporting functions of the contact center 120. The contact center 120 may comprise multiple distributed contact centers 120. For example, the contact center 120 may comprise a contact center 120 in the United States and a contact center 120 in Canada.

The contact center 120 further comprises a call handler 121, work assignment engine 122, contact center queue(s) 123, skill group(s) 124, and internal events 126. The call handler 121 can be any hardware coupled with software that can route communications in the contact center 120, such as a Private Branch Exchange (PBX), a switch, a session manager, a communication manager, a router, an email system, an instant messaging system, a text messaging system, a video switch, and/or the like. The call handler 121 can route various kinds of communications, such as voice calls, video calls, Instant Messaging (IM), text messaging, emails, virtual reality communications, and/or the like. The work assignment engine 122 is able to make routing decisions for incoming communications. In various embodiments, the work assignment engine 122 can make routing decisions for communications in combination with the call handler 121. Aspects of the work assignment engine 122 may be entirely performed by the call handler 121.

The contact center queue(s) 123 are queues for holding incoming and/or outgoing communications for the contact center 120. The contact center queue(s) 123 can hold similar types of communications (e.g., voice calls only) or different types of communications (e.g., voice, video, text messaging, virtual reality, email, and/or IM communications). The contact center queue(s) 123 may be implemented in various manners, such as, on a first-in-first-out (FIFO) basis. In some embodiments, calls may be placed higher in the contact center queues 123 based on various metrics. The contact center queue(s) 123 may be dynamically defined to have different amounts and/or types of communications that can be held in the contact center queue(s) 123. For example, a contact center queue 123 may be initially configured to support twenty voice calls and one hundred emails. Later, the same contact center queue 123 may be dynamically configured to support twenty five voice calls and thirty IM sessions.

Although not shown, the contact center 120 may be implemented as a queue-less contact center 120. In a queue-less contact center 120, the communications are placed into a pool where contact center agents 131A-131N may select which contacts are to be worked on.

The skill group(s) 124 are groups that are typically associated with one or more products and/or services that are supported by the contact center agents 131A-131N. For example, a first skill group 124 may be created to support high definition televisions and a second skill group 124 may be created to support laptop computers. A skill group 124 may be typically associated with a contact center queue 123. In some embodiments, there may be an individual skill group 124 for each contact center queue 123 (a one-to-one ratio). Alternatively, a skill group 124 may be associated with two or more contact center queues 123 or a contact center queue 123 may be associated with two or more skill groups 124. One of skill in the art could envision various combinations of contact center queue(s) and 123/skill group(s) 124. A skill group(s) 124 may comprise human agent(s) (e.g., contact center agents 131A-131N) and/or non-human agent(s) (e.g., IVR system(s), automated agent(s), etc.).

A skill group 124 may be specific to a particular communication type. For example, a product/service may have separate skill groups 124 for voice, video, email, IM, webcast, text messaging, and virtual reality communications. Alternatively, skill groups 124 may support all or only a portion of the supported communication types.

In some embodiments, a skill group 124 may be a web chat form where communications are routed to the web chat forum. The web chat forum may be a social media network 140 (or other online site, such as a blog, etc.) where users can discuss an issue managed by the contact center 120 to resolve a problem and/or issue. The web chat forum may be supervised by one or more contact center agents 131A-131N, a supervisor, and/or an administrator, etc.

The internal events 127 are events that occur within the contact center. They may include queue updates, agent skillset updates, performance metrics of the contact center that are monitored including thresholds for changes to be implemented, etc.

In some embodiments, all events of the contact center 120 (including all communications that arrive at the contact center 120) may be transferred to the call handler 121 for further analysis and processing (e.g., for assigning a communication to a contact center queue 123, for determination of a communication event such as assigning/forwarding to a particular contact center agent 130A-130N, for updating of a wrap-up time, etc.). The call handler 121 may correspond to a server or set of servers that are configured to receive communications and make routing decisions for the communications within the contact center 120. A single server or a set of servers may be configured to establish and maintain communication channels between endpoints 101A-101N and the contact center 120. In some embodiments, the call handler 121 may ensure that an appropriate agent or set of agents 131A-131N are assigned to a particular communication channel (e.g., a voice-based communication channel) for purposes of servicing/addressing contacts initiated by customers of the contact center 120 via endpoints 101A-101N.

While certain components are depicted as being included in the contact center 120 (such as the call handler 121), it should be appreciated that one or more components may be provided in any other server or set of servers in the contact center 120. For instance, components of the call handler 121 may be provided in a work assignment engine 122 and/or one or more communication servers (not shown), or vice versa. Further still, embodiments of the present disclosure contemplate a single server that is provided with all capabilities of the work assignment engine 122, the call handler 121, and any communication server(s). The call handler 121 may intelligently route messages to particular agents 131A-131N (or particular inboxes assigned to an agent or queue or pool of agents).

In various embodiments, the call handler 121 may be configured to determine which agent 131A-131N should be assigned to a particular communication channel (e.g., assigned to a particular voice call channel, assigned to a particular message inbox, assigned to a particular chat channel, and/or designated to receive a particular email message) for purposes of communicating with a user (e.g., to provide an answer to a user's question, to provide a service to a user, etc.). When communications are received from an endpoint 101A-101N and assigned to a particular communication channel, the call handler 121 may initially assign the communication to a particular communication channel that is hosted by a server.

The call handler 121 may provide appropriate signaling to an agent's communication device 130A-130N that enables the agent's communication device 131A-131N to connect with the communication channel over which the user is communicating and/or to enable the agent 131A-131N to view messages sent by the user's endpoint 101A-101N, which are eventually assigned to and transferred to the appropriate communication channel.

In some embodiments, a server may be responsible for establishing and maintaining a communication channel that is presented to the user's endpoint 101A-101N and which enables the user to send communications to the contact center 120 when desired. As a non-limiting example, the server may correspond to an email server or the like that is configured to process messages received from the call handler 121 and utilize an email messaging protocol (e.g., to inform an agent 130A-130N of a received message, to enable an agent 130A-130N to respond to received messages, etc.). Non-limiting examples of protocols that may be supported by the communication server 128 include Internet Message Access Protocol (IMAP), Post Office Protocol (POP), Simple Mail Transfer Protocol (SMTP), and Exchange. The server may alternatively or additionally be configured to support real-time or near-real-time text-based communication protocols, video-based communication protocols, and/or voice-based communication protocols.

The call handler 121 may be configured to support any number of communication protocols or applications whether synchronous or asynchronous. Non-limiting examples of communication protocols or applications that may be supported by the communication server 128 include webcast applications, the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging (WAMP), SOAP, MIME, Real-Time Messaging Protocol (RTP), Web Real-Time Communications (WebRTC), WebGL, XMPP, Skype protocol, AIM, Microsoft Notification Protocol, email, etc.

In some embodiments, the call handler 121 includes an event log (e.g., a bus) of the contact center 120, where events may be published on the bus via the call handler 121. Interested applications may then consume the streaming events during operation of the contact center 120. For example, regarding wrap-up times, various wrap-up times may be set by default within the contact center and may be based on any type of criteria (such as different wrap-up times for different locations, different wrap-up times for different contact center queues 123, different wrap-up times for different skill groups 124, etc.). Any updates or changes to a wrap-up time may be determined by an external system (e.g., the wrap-up engine 125) that injects, e.g., using an Application Programming Interface ("API"), an event for the updated wrap-up time into the bus of the contact center.

In addition to the standard set of desktop applications that agents and supervisors of the contact center use, the systems disclosed herein may have permitted clients (e.g., agents, supervisors, administrators, etc.) and/or applications (e.g., AI applications including sentiment analysis applications, rule applications, etc.) that have permission to manage agent states in the contact center 120. However, only some agents and clients may be permitted to manage agent states in the contact center; for example, one AI application may have permissions, while another AI application may not. The AI application that does not have permissions is not able to update wrap-up times. In various embodiments, having permission to manage agent states to update wrap-up times means having permission to invoke the wrap-up API to modify the time used for wrap-up by inserting a wrap-up event into the bus.

The wrap-up times may be updated, and the events for the wrap-up times may be communicated to and published on the bus, at any time including in real-time. Updates to a wrap-up time may be relevant to a single communication session or multiple communication sessions (e.g., based on a common contact center agent or agents 131A-131N, based on a common contact center queue 123, based on a skill group 124, based on a location, based on a user identifier, etc.)

For example, information from one or more external or internal sources may be identified, collected, and/or analyzed to determine an updated wrap-up time. The updated wrap-up time is then communicated in real-time to an API that configures the corresponding events to be published. Any or all of these activities may occur before, during, or after a communication session in order to update one or more wrap-up times in the contact center. If these activities occur in real-time and the update to the wrap-up time is relevant to a communication session that is occurring, then the wrap-up time for the communication session may be updated (e.g., as an event injected into the bus) before the communication session ends. In addition, these activities may occur multiple times before, during, and/or after a communication session to update wrap-up times. Thus, for example, a wrap-up time for a particular communication session may be updated multiple times (e.g., by multiple events injected by the API to the bus) before the communication session ends. The events may be conveyed using a LAN, WAN, bus, or other communication facility between one or more components and the call handler 121.

The wrap-up engine 125 can interact with the components of system 100 via network 110. The wrap-up engine 125 may also interact with other components of the system 100 that are not shown in FIG. 1, such as one or more servers, memory, engines, and machines. For example, the network 110 may be configured to enable a server to communicate with other machines in the contact center 120 and/or to communicate with other machines connected with the network 110.

In various embodiments, memory stores the wrap-up engine 125 for execution by one or more processors. In some embodiments, the wrap-up engine 125 may correspond to a set of processor-executable instructions (e.g., a finite instruction set with defined inputs, variables, and outputs). In some embodiments, the wrap-up engine 125 may correspond to an AI component of the contact center 120 that is executed by a processor. The wrap-up engine 125 may be configured to operate using a set of guidelines (e.g., as a set of static instructions) or by using machine learning. The wrap-up engine 125 can include additional components and scripts to execute the functionality described herein, as would be understood by a person of ordinary skill in the art. Although the wrap-up engine 125 is shown as being separate from the contact center 120 in FIG. 1, the wrap-up engine (or various functionality or components of the wrap-up engine 125) may be incorporated into the contact center 120 or other components of system 100.

The wrap-up engine 125 can determine updates to the wrap-up times implemented in the contact center 120. The wrap-up engine 125, in some embodiments, may utilize one or more data models, which may be in the form of an artificial neural network, for recognizing and processing information that is external or internal to the contact center 120. In some embodiments, the wrap-up engine 125 utilizing machine learning may have access to training data 160 to initially train behaviors of the wrap-up engine 125 and may be also be programmed to learn from additional communication information, such as communications as they occur in real-time, or after communications occur. The wrap-up engine 125 may also be configured to learn from further communications or contact center dispositions based on feedback, which may be provided in an automated fashion (e.g., via a recursive learning neural network) and/or a human-provided fashion (e.g., by a human agent of the contact center 120). In some embodiments, the wrap-up engine 125 may update one or more of the data models as it learns from ongoing communications and dispositions within the contact center 120. In various embodiments, the wrap-up engine 125 updates wrap-up times by providing appropriate signaling to the call handler 121. For example, the wrap-up engine 125 can, in conjunction with an API, provide events which are posted on a bus and then consumed by the appropriate contact center elements.

In some embodiments, servers may be configured to perform a particular task or a set of tasks specific to supporting functions of the wrap-up engine 125. For instance, the wrap-up engine 125 may correspond to a server or set of servers that are configured to receive information, make decisions regarding wrap-up times as they relate to communications within the contact center 120, and communicate events regarding wrap-up times to a bus of the contact center 120. A single server or a set of servers may be configured to execute one or more scripts (referred to herein interchangeably as "scripts" or "script") to perform the functionality.

The scripts of the wrap-up engine 125 may control when or how information is used or applied to determine an updated wrap-up time. The information may be external to the contact center 120, internal to the contact center 120, or a combination of both. Examples of external information include, but are not limited to, social media network(s) 140, sentiment data 141, news feed(s) 142, and/or business rule(s) 143. In some embodiments, only certain external information may be collected (e.g., news stories related to specific key words and/or phrases, updates to certain business rules, identification of negative sentiment data, etc.). In additional embodiments, information may be obtained based on monitoring a participant's speech or appearance based on certain conditions occurring, such as detecting a key word, detecting a sentiment of the participant, etc. In additional embodiments, the scripts may report out whenever any new information is detected for any of the communication session participants.

Any information that is used may be used independently of other information, or may be dependent on other information and/or other conditions occurring. In some embodiments, the script(s) can be defined so that a single script is executing for all incoming communication sessions. In other embodiments, multiple scripts can be defined that operate on distinct communications or communication sessions. For example, a first script could operate for communications associated with a certain incoming call campaign, whereas a second script could operate for communications associated with another incoming (or outgoing) call campaign. A call campaign can include communications having a common property (e.g., a common topic, location, user, device 101A-101N and/or 130A-130N, agent 131A-131N, contact center queue 123, skill group 124, etc.) Thus, scripts can be associated to process calls for a particular call campaign, call type (incoming or outgoing), for a particular incoming telephone number, trunk group, and/or any other property or distinguishing aspect.

The scripts can be programmed to apply different external and/or internal information at different times. This provides flexibility as to defining which information is analyzed and when. This flexibility may save processing resources. For example, a voice communication that is related to customers located in the U.S. would not require applying information for communications of customers located in Canada to the voice communication, and this would reduce the number of events processed by wrap-up engine 125 and the call handler 121. Of course, other embodiments may simply define broad information that is able to accommodate all needs and simply receive and process the entirety of the broad information. Based on the processing of the information by the wrap-up engine 125, events may be sent to the call handler (e.g., by sending events notifications to a bus via an API).

Events received by the call handler 121 from the wrap-up engine 125 may include various types of identifying information indicating how the wrap-up time updates are to be applied, e.g., any type of communication identifier may be included in the event. If there are multiple communications at the contact center 120, then communication identification information can be included so that the contact center scripts know which communications the wrap-up event pertains to. In some embodiments, multiple communications, resources, and/or properties may be applicable to an event.

Events may be transmitted in real-time from one or more components described in FIG. 1 to the call handler 121. In some embodiments, timing information (e.g., a time-stamp) regarding the event may be provided. Thus, the scripts can account for the timing information if desired, as well as accounting for other event information.

The scripts executing in a processor (e.g., in the wrap-up engine 125 and/or in the call handler 121) can further define what action(s) should occur upon receiving the event. Thus, updated wrap-up times may be implemented in the contact center 120, and the updated wrap-up times may be based on information that is external to the contact center 120 and/or internal to the contact center 120. In some embodiments the scripts may incorporate multiple threads of logic for acting on distinct event notifications, or separate scripts may concurrently act upon a same communication. The scripts can be programmed to handle various types of external contact center 120 information, so that the systems and methods described herein are flexible enough to be defined as needed to perform updating, including real-time updating, of wrap-up times.

The scripts and API protocol may have a fixed or variable structure, and a limited set of elements may be sufficient to provide the necessary information. The scripts and API protocol can vary in complexity. The functionality of the scripts and the API as described herein may be allocated between various components (for example, between the wrap-up engine 125 that is external to the contact center 120 and the call handler 121 within the contact center 120, between different components within the contact center 120, etc.). In some embodiments, more complex logic processing may be placed in the call handler 121 as opposed to the wrap-up engine 125 because this can simplify the functionality in the wrap-up engine 125, or vice versa.

As discussed in the illustrative embodiments herein, events to update a wrap-up time may be advantageously created and posted on the bus of the contact center 120. When an appropriate event is posted on the bus, for example an appropriate agent state, then wrap-up processing logic (that may be determined by an API) may be invoked. In various embodiments, a control application may provide the timing of when a wrap-up time is provided to an agent, and the wrap-up time may be updated before, during, or after a communication, as well as multiple times per communication.

Various actions may occur, or be taken by components of the system, including by agents 131A-131N of the contact center 120, before or after a wrap-up time is updated, in response to the events and/or in response to or during the wrap-up time. For example, data may be managed (e.g., stored, reported, etc.). This may be done in an automated manner, or by a human action. Data can be written indicating that a particular context occurred, any properties that were detected, what occurred for which communications, etc. An agent may have a role in managing the data, or the data may be managed without human or agent interaction, such as by an AI component. In various embodiments, properties of an agent may be used to influence the wrap-up time. For example, if an agent requires training, wrap-up times for that agent could be extended. In various embodiments, conditional rules may be applied. For example, the agent needing training could have the wrap-up time extended only if the contact center 120 is understaffed at the time the communication ends.

In various embodiments, a call control application may be invoked to implement the systems and methods discussed herein, and this may be based on one or more events, such as by an updated wrap-up time event. The call control application could disposition the communication, invoke a recording function, change a logic flow in the call handler 121 and/or the wrap-up engine 125, update a dashboard or reports, and/or send an alert that provides communication related status indicators or statistics, etc. For example, detection of a user's identity may cause a condition to be set for facial recognition to be implemented for the user. This may be processed by the wrap-up engine 125 as external information. The alerts may include notifying an agent's supervisor of a detected condition. The detected condition may involve a start or stop of the wrap-up time, an update to a wrap-up time, violating a wrap-up time condition (e.g., an agent exceeding the wrap-up time, an agent pausing the wrap-up time a number of times that exceeds a set number of times, etc.), and further information as to the status of the communication. Any one or more, or combination of, the above occurrences may be used in the methods and systems described herein.

The embodiments advantageously are a powerful tool to augment the call center's capabilities using wrap-up times. For example, the wrap-up times may be more accurately set for communications of the contact center 120, which can help avoid or reduce various issues within the contact center 120 by proactively managing wrap-up times and/or providing improved management of wrap-up times. By adjusting wrap-up times, an agent can have a more appropriate amount of time to complete post-communication tasks. This saves resources by streamlining the wrap-up processing, e.g., by reducing or eliminating the amount of times that the agent must violate wrap-up times in order to finish post-communication items, or by setting a shorter wrap-up time if needed. Having improved wrap-up times can advantageously reduce other costs in the contact center 120 by reducing or eliminating unnecessary reporting and tracking of wrap-up time statistics, including violations.

Figure 2:
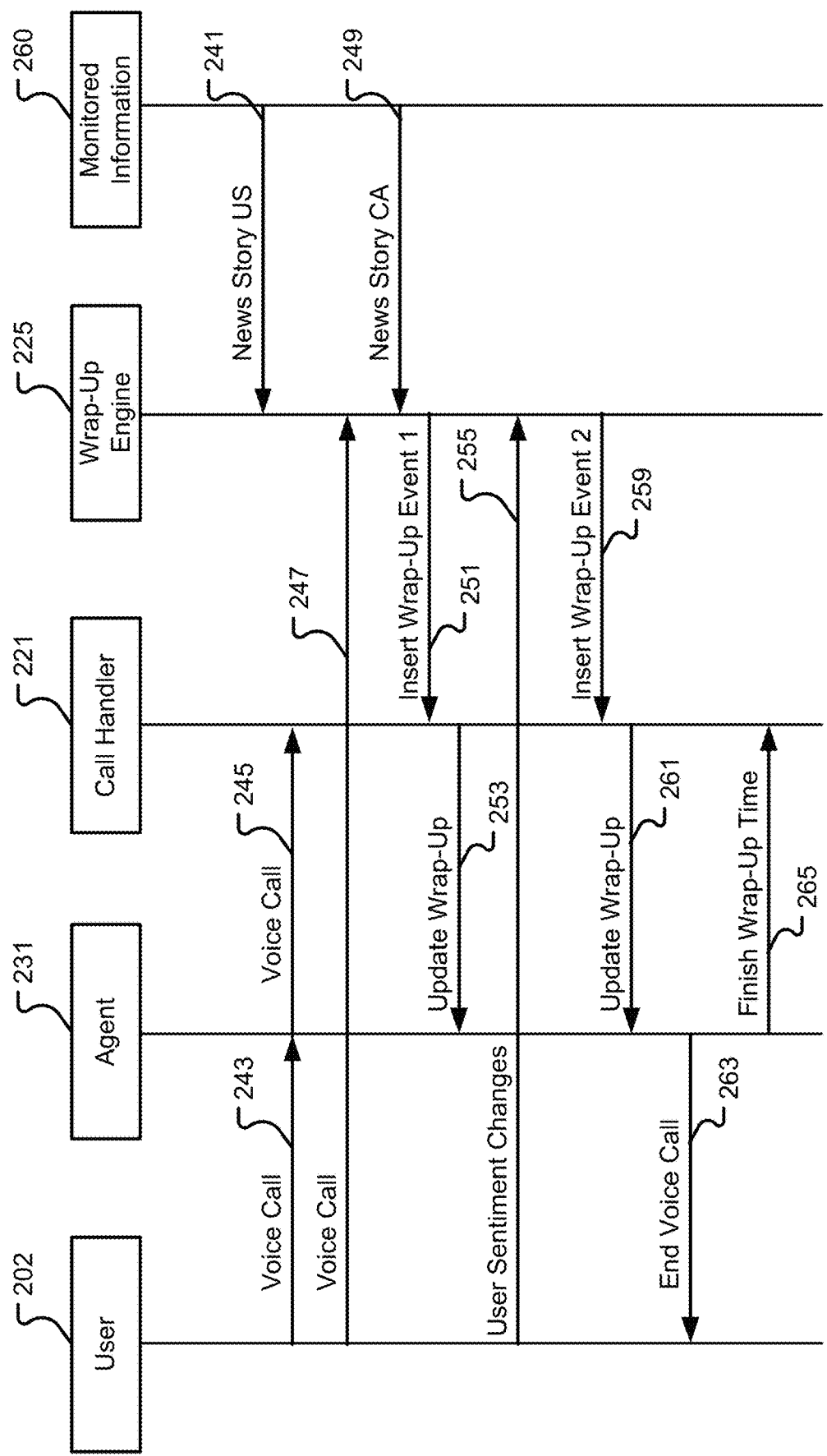
FIG. 2 is a message flow of various configurations of using a wrap-up engine in accordance with at least some embodiments of the present disclosure.

FIG. 2 is a message flow of various configurations of using a wrap-up engine in accordance with at least some embodiments of the present disclosure. In some aspects, the components shown in FIG. 2 may correspond to like components shown in FIG. 1. In the illustrative message flow of FIG. 2, the user 202 (e.g. a callee), the agent 231, the call handler 221 (e.g., a dialer), the wrap-up engine 225, and monitored information 260 are shown and the message flow provides an example application of using the API in the call handler 221. In various embodiments, the monitored information 260 (or various components and/or modules of the monitored information 260) may be a part of the wrap-up engine 225. Time is represented as increasing in a downward direction.

Monitored information 260 may identify information that is news story US 241 and send the information regarding news story US 241 to the wrap-up engine 225. Monitored information 260 is information that is internal and/or external to the contact center 120 and can correspond to the information (e.g., social media network(s) 140, sentiment data 141, news feed(s) 142, business rule(s) 143, etc.) as described in FIG. 1. Thus, the news story US 241 may be information from news feed(s) 142.

The wrap-up engine may determine whether a wrap-up time for any communications of the contact center 120 should be adjusted after receiving news story US 241 from the monitored information 260. The news story US 241, for example, may be a news story about a change in tax law that has occurred in the United States. In this example, the wrap-up engine 125 analyzes the news story US 241 and determines that it is not relevant to communications occurring in the contact center 120 because the contact center 120 does not have any communications related to US tax law and thus, the wrap-up time does not need to be updated. Therefore, no event is published in the call handler 221.

A user 202 places a voice call 243 to a contact center and is connected to an agent 231. Although FIG. 2 shows a user 202 and an agent 231, as a person of ordinary skill in the art would understand and appreciate, the user 202 and agent 231 may establish various communication channels using one or more devices. The voice call 243 may be handled by a call handler 221 by being sent as voice call 245 to the call handler 221. Although two voice calls 243, 245 are shown in FIG. 2 as occurring at substantially the same time and being connected between the user 202 and agent 231, and connected between the agent 231 and call handler 221, respectively, the voice communications can occur at other timings, different times, and different intervals of time. For example, the call handler 221 can originate an outbound communication to callee (e.g., a called party) and can establish contemporaneously a communication to an agent. Thus, in various ways, the call handler 221 can establish a call between the user 202 and the agent 231.

In various embodiments, the voice call may also be monitored for any specified events. For example, a communications channel can be established between user 202 and the wrap-up engine 225. In the message flow of FIG. 2, voice call 247 is established between user 202 and the wrap-up engine 225 and the wrap-up engine 225 is able to receive data (e.g., audio or visual data) from the voice call 247, and perform processing on the data. This processing may involve identifying audio and/or visual content (e.g., content from the agent 231 versus the user 202) and processing the audio and/or visual content. For example, the processing can identify phenomes in the audio that are used to detect key words. Further processing of the audio can include detecting key words or changes in tone or level of voice and determining appropriate information to provide to the call handler 221. When the wrap-up engine 225 is able to receive data from communications, it is able to detect relevant information (e.g., words or sentiments expressed by the agent 231 or the user 202). In various embodiments, voice call 247 transfers the same communication data as voice call 243 and voice call 245, so that the wrap-up engine 225 receives all the voice data from the communication session between user 202 and agent 231. Although the voice call 247 is shown as occurring later than voice calls 243, 245, these voice calls may occur at substantially the same time or can occur at other timings, different times, and different intervals of time. For example, the call handler 221 can originate an outbound communication to callee (e.g., a called party) and can establish contemporaneously a communication to an agent 231 and the wrap-up engine 225.

The wrap-up engine 225 may include one or more control logic scripts executed by a processor that define functionality associated with the functionality of the wrap-up engine 225. For example, one or more scripts can define what to monitor (e.g., sentiments expressed, the agent's 231 speech, the user's speech 202, all audio content, all video content, etc.), when to perform the monitoring, and how to apply information to determine a wrap-up time, among other criteria. Other scripts can define what is sent to the call handler 221 (or an API) indicating that certain information (e.g., sentiment(s), word(s), image(s)) has been detected. The wrap-up engine 225 may also be able to receive communication session identification information and associate the communication session with the relevant information. After the voice call 247 is received at the wrap-up engine 225, time proceeds as the voice call progresses and no relevant information (such as a negative sentiment) is detected in the audio of voice call 247; thus, the wrap-up engine 225 does not provide input to the call handler 221 (e.g., to an API interfacing with the call handler 221) and so no wrap-up event is published in the call handler 221.

After the voice communication channels are established (e.g., voice call 243, voice call 245, and voice call 247), the wrap-up engine may receive another news story, news story CA 249, from the monitored information 260. Monitored information 260 identifies information that is news story CA 249 and sends the information regarding news story CA 249 to the wrap-up engine 225. The wrap-up engine determines that a wrap-up time for some communications of the contact center 120 should be adjusted after receiving news story CA 249 from the monitored information 260. The news story CA 249, for example, may be an announcement that the tax system has been changed for pensions in Canada. The contact center 120 for customers of the pension plan is located in the United States and has customers from both the United States and Canada calling in to the contact center. However, the wrap-up engine 225 determines that the Canadian customers may be worried and have additional questions regarding the tax change, so the system can take this into account (e.g., where the call is originating from, such as Canada) and apply that to the wrap-up time. Thus, the wrap-up engine 225 determines that the communications from Canadian customers will likely become more time-intensive due to the changes in Canadian tax law summarized in news story CA 249. Therefore, the wrap-up engine 225 determines (e.g., using analysis information from an AI system) that wrap-up times for communications of Canadian customers need to be updated to be an extended amount of time. Thus, the wrap-up engine 225 inserts a wrap-up event 1 251 to call handler 221 to extend the wrap-up time (e.g., by providing a calculated wrap-up time to an API, which submits an event to the call handler 221 to be published on the bus).

The wrap-up engine 225 may insert the wrap-up event 1 251 to the call handler 221 using an API. The wrap-up engine 225 may provide the relevant information (e.g. information from news story CA 249) to an API and the API can process the information to insert the updated wrap-up time as an event on a bus of the call handler 221. The wrap-up event 1 251 may update the wrap-up time for communications related to Canadian tax law to extend the amount of wrap-up time for each of the communications. For example, if the wrap-up time was originally set for 50 seconds, the updated wrap-up time of wrap-up event 1 251 may be set for 90 seconds.

In various embodiments, the updated wrap-up time may be conveyed to the agent. For example, the call handler 221 may update the wrap-up time 253 on a display of a device of the agent that displays the wrap-up time for the communication session. The agent may then be aware that they have a different amount of time during which to complete post-communication tasks once the communication session ends.

As time progresses, the user sentiment may negatively change 255 and such a change may be detected by the wrap up engine 225. For example, during the communication session (e.g., voice call 247), an AI system of the wrap-up engine 225 may compare the user's vocal expressions with stored sentiment data and thereby determine, during the communication session, that the user 202 has a negative vocal expression. The AI system may then determine that this information is relevant to updating the wrap-up time and based on this information, the wrap-up engine 225 may invoke the API of the call handler 221 to insert the wrap-up event 2 259. The wrap-up engine 225 calculates an updated wrap-up time based on the information and provides the updated wrap-up time to the API to be published to the bus of the contact center 120 via the call handler 221. Because the insert wrap-up event 2 259 occurs after the insert wrap-up event 1 251, the wrap-up time updated 261 to the agent 231 is the wrap-up time corresponding to insert wrap-up event 2 259. In various embodiments, the updated wrap-up time for wrap-up event 2 259 may be greater than the wrap-up time that was updated from insert wrap-up event 1 251. For example, the system (e.g., the wrap-up engine 225) may determine that, although the wrap-up time was lengthened based on news story CA 249, because the user 202 has had a negative sentiment detected, then the wrap-up time should be lengthened even further, for example to 120 seconds. Thus, the event of the updated wrap-up time (e.g., updating the wrap-up time to 120 seconds) may be used by a contact center 120 application that is responsible for setting wrap-up times, and updating the relevant wrap-up time 261.

In some embodiments, a display of the wrap-up time to the agent 231 may be updated to show the updated wrap-up time 261. The voice call may end 263 and then the wrap-up time may commence, with the agent 231 handling the post-communication session tasks during the timespan of the wrap-up time (e.g., the 120 seconds) until the wrap-up time finishes 265 (e.g., the system has counted down to the end of the 120 seconds).

As shown in FIG. 2, the wrap-up engine 225 may advantageously determine when and how to update wrap-up times for relevant communication sessions by publishing events communicating the updated wrap-up times to a bus (e.g., call handler 121) in the contact center 120. This may provide more relevant and/or useful wrap-up times to improve the functioning of the contact center 120.

Figure 3:
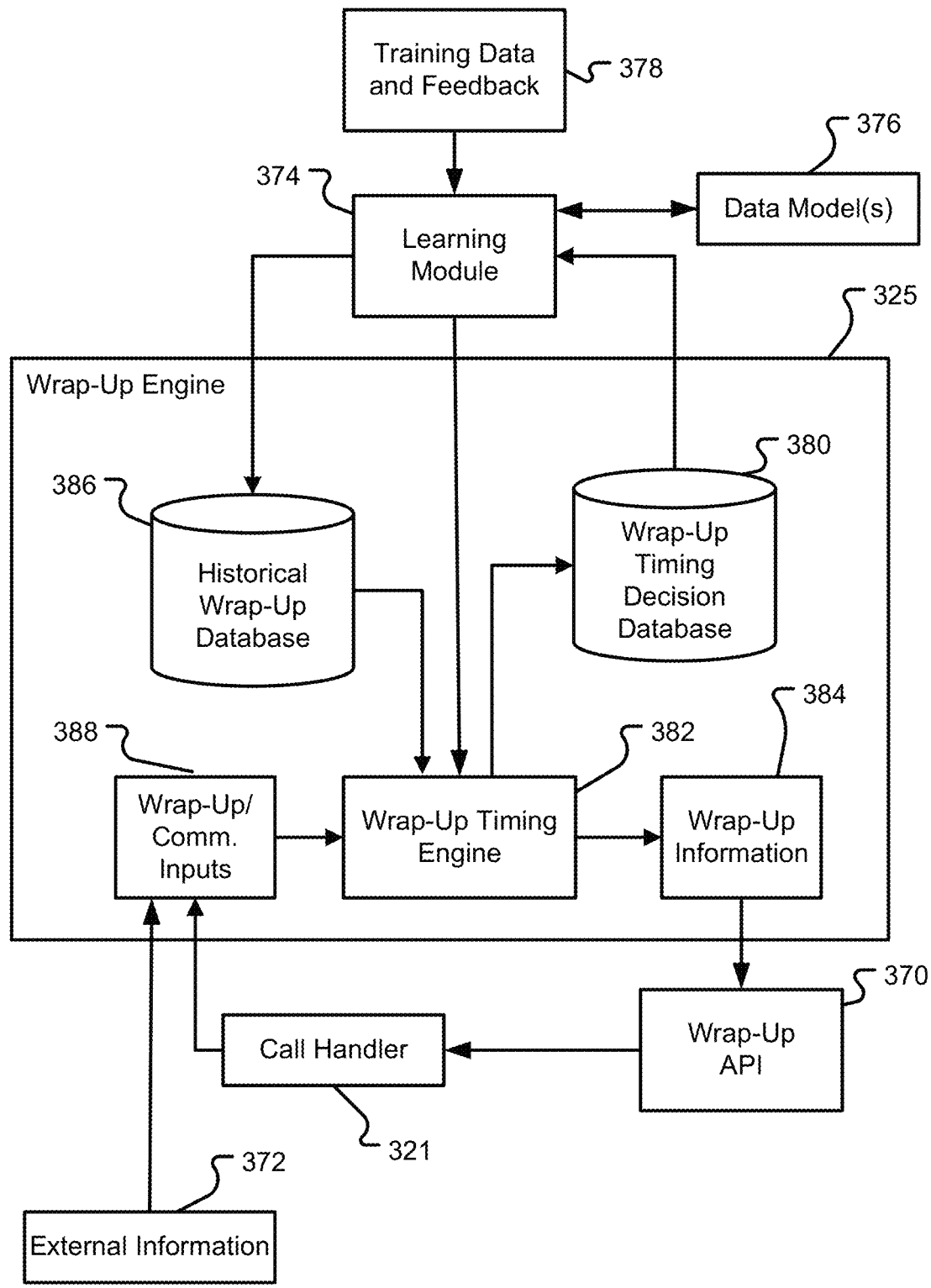
FIG. 3 is a block diagram depicting additional details of a wrap-up engine in accordance with at least some embodiments of the present disclosure.

FIG. 3 is a block diagram depicting additional illustrative details of a wrap-up engine in accordance with at least some embodiments of the present disclosure. In some aspects, the components shown in FIG. 3 may correspond to like components shown in FIGS. 1 and 2. In FIG. 3, a wrap-up engine 325 interacts with a call handler 321, wrap-up API 370, external information 372, and a learning module 374. The learning module 374 receives input from training data and feedback 378 and sends and receives information from data model(s) 376. The wrap-up engine 315 includes a historical wrap-up database 386, a wrap-up timing decision database 380, a wrap-up/communication inputs 388, a wrap-up timing engine 382, and wrap-up information 384.

The learning module 374 may utilize machine learning and have access to training data and feedback 378 to initially train behaviors of the learning module 374. Training data and feedback 378 contains training data and feedback data that can be used for initial training of the learning module 374 and this training data may be different than, and is not to be confused with, training data for training agents, which is also discussed herein. The learning module 374 may also be configured to learn from other data, such as further contact center events or message exchanges based on feedback, which may be provided in an automated fashion (e.g., via a recursive learning neural network) and/or a human-provided fashion (e.g., by one or more human agents, such as agents 131A-131N). The learning module 374 may additionally utilize training data and feedback 378. For example, the learning module 374 may have access to one or more data model(s) 376 and the data model(s) 376 may be built and updated by the learning module 374 based on the training data and feedback 378. The data model(s) 376 may be provided in any number of formats or forms. Non-limiting examples of data model(s) 376 include Decision Trees, Support Vector Machines (SVMs), Nearest Neighbor, and/or Bayesian classifiers.

The learning module 374 may also be configured to access information from a wrap-up timing decision database 380 for purposes of building a historical wrap-up database 386. The wrap-up timing decision database 380 stores data related to wrap-up timings, including but not limited to historical wrap-up timings, wrap-up processing history, wrap-up notes, agent(s) (e.g., one or more of agents 131A-131N) notes associated with wrap-up timings, wrap-up decisions, etc. Wrap-up information within the historical wrap-up database 386 may constantly be updated, revised, edited, or deleted by the learning module 374 as the wrap-up engine 325 processes additional wrap-up timing decisions.

In some embodiments, the wrap-up engine 325 may include a wrap-up timing engine 382 that has access to the historical wrap-up database 386 and selects appropriate wrap-up processing decisions (e.g., presented in wrap-up information 384) based on input from the historical wrap-up database 386 and based on wrap-up/communication inputs 388 received from the call handler 321 and/or external information 372. The wrap-up engine 325 may receive wrap-up/communication inputs 388 in the form of external information 372 (e.g., social media network(s) 140, sentiment data 141, news feed(s) 142, and/or business rule(s) 143, etc.), real-time wrap-up data from the call handler 321, and/or other communication or contact center 120 information from the call handler 321. For example, the wrap-up/communication inputs 388 may include information about any wrap-up timing(s) recently set for various communication sessions, and variations or violations of wrap-up timings, and any other information from the call handler 321. The wrap-up timing engine 382 may make decisions regarding what wrap-up information 384 to provide to update wrap-up times based on any of the criteria described herein, including but not limited to information provided by the learning module, information about current status of wrap-up times (e.g., violations of current wrap-up times), feedback about wrap-up times (e.g., from agents, supervisors, agent training information, etc.), performance metrics related to wrap-up times or any other aspects of the contact center 120, customer feedback, etc. To enhance capabilities of the wrap-up timing engine 382, the wrap-up timing engine 382 may constantly be provided with training data and feedback 378 from conversations between agents 131A-131N and customers that have occurred over a particular timeframe, communication channel, location, and/or other parameters. Therefore, it may be possible to train a wrap-up timing engine 382 to have a particular output or multiple outputs. In various embodiments, the output of an AI application (e.g., learning module 374) is an updated wrap-up time that is sent, with appropriate information conveying how to apply the updated wrap-up time to specified communications, via the wrap-up timing engine 382 and from wrap-up information 384, to the wrap-up API 370.

Using the wrap-up/communication inputs 388 and the historical wrap-up database 386, the wrap-up engine 325 may be configured to provide wrap-up information 384 (e.g., one or more wrap-up times) to the wrap-up API 370 so that the wrap-up API 370 can publish one or more events, based on the wrap-up information 384, to the call handler 321 to update one or more wrap-up times for one or more communication sessions. An event of an updated wrap-up time may be provided as an output of the wrap-up timing engine 382 (e.g., processed through the wrap-up API 370) to the call handler 321. The API may be a readily visible API that is exposed to an external system (e.g., a system external to the contact center 120 such as the wrap-up engine 325) and the API injects an event (e.g., a Wrap Up event) into the contact center system (e.g., the call handler 321) to modify a wrap-up value on an ad-hoc basis based on the determinations (e.g., the wrap-up information 384) of the external system.

In some embodiments, the event resulting from the invocation of the API is published onto a Kafka bus of the contact center 120 and a Ready Service has subscribed for interest in wrap-up events. The Ready Service is, for example, a microservice that determines whether an agent is available for new work by consuming events (e.g., including disconnect events from engagements such as web chats, social media, and voice/video calls) from a Kafka bus. An event may be published on the Kafka bus by invoking an Agent State API, which permits authorized clients to influence the states of the contact center 120 agents. Thus, a wrap-up event can be consumed by the Ready Service, which then uses the time identified in the wrap-up event to set the wrap-up time for the applicable communication that is in-progress or about to end. In various embodiments, wrap-up processing logic may be included within the Ready Service, a wrap-up event may be included in an event catalogue, and a wrap-up API may be introduced into the Agent State API grouping. Further, external applications, for example, an AI application that is monitoring variables (such as Real Time Sentiment and Customer Net Promoter Score (also known as "NPS," which is a measure of the satisfaction of a customer or how likely a customer is to recommend you to a friend or colleague)) can be authorized to invoke the wrap-up API. Therefore, wrap-up time as disclosed herein becomes an event-based data item, which can be determined in real time and exposed to authorized applications to influence.

In various embodiments, there can be little or no manual configuration of the wrap-up times and no static value for the wrap-up times because the wrap-up times may be set on an ad hoc basis. For example, an AI or machine learning application may be enabled to integrate with the systems and methods of the contact center 120 in order to advantageously determine and implement updated and customizable wrap-up times. Such embodiments are advantageous by automating and quickly adjusting (with little or no manual configuration) wrap-up times in the contact center 120 so that resources of the contact center 120 are saved.

In some embodiments, the wrap-up engine 325 may interact with the contact center 120 as follows. The call handler 321 may serve a plurality of agent terminals 130A-130N and there can be a plurality of communications occurring between the call handler 321 and the user endpoints 101A-101N. Event notifications are created by scripts in the contact center 120 and/or the wrap-up engine 325. The scripts in the wrap-up engine 325 may be run by the wrap-up timing engine 382 using information from one or more of the wrap-up/communication inputs 388, the historical wrap-up database 386, and/or the learning module 374. The scripts can create events that are posted to the bus in the call handler 321, and the events may map communication reference information in each event to a particular communication or group of communications (e.g., by a identifying a particular agent terminal, user endpoint, skill group 124, contact center queue 123, etc.), so that any actions performed based on the event can be appropriately implemented to the desired communication or set of communications. The set of communications may be all communications involving any one or more agents, agent terminals 130A-130N, users, user endpoints 101A-101N, skill group 124, contact center queue 123, etc. The scripts may create events that are directed to a common resource (e.g., a database, a contact center queue 123, a skills group 124, etc.) that multiple agents use, or events that are directed to a common property (e.g., a geographical location, a specific business name, a user identification, a key word and/or key phrase, etc.), and such events may require different variations in mapping. Thus, events concerning updated wrap-up times are entirely customizable, and have the ability to be communication-specific, be directed to a common resource and/or property, etc.

Figure 4:
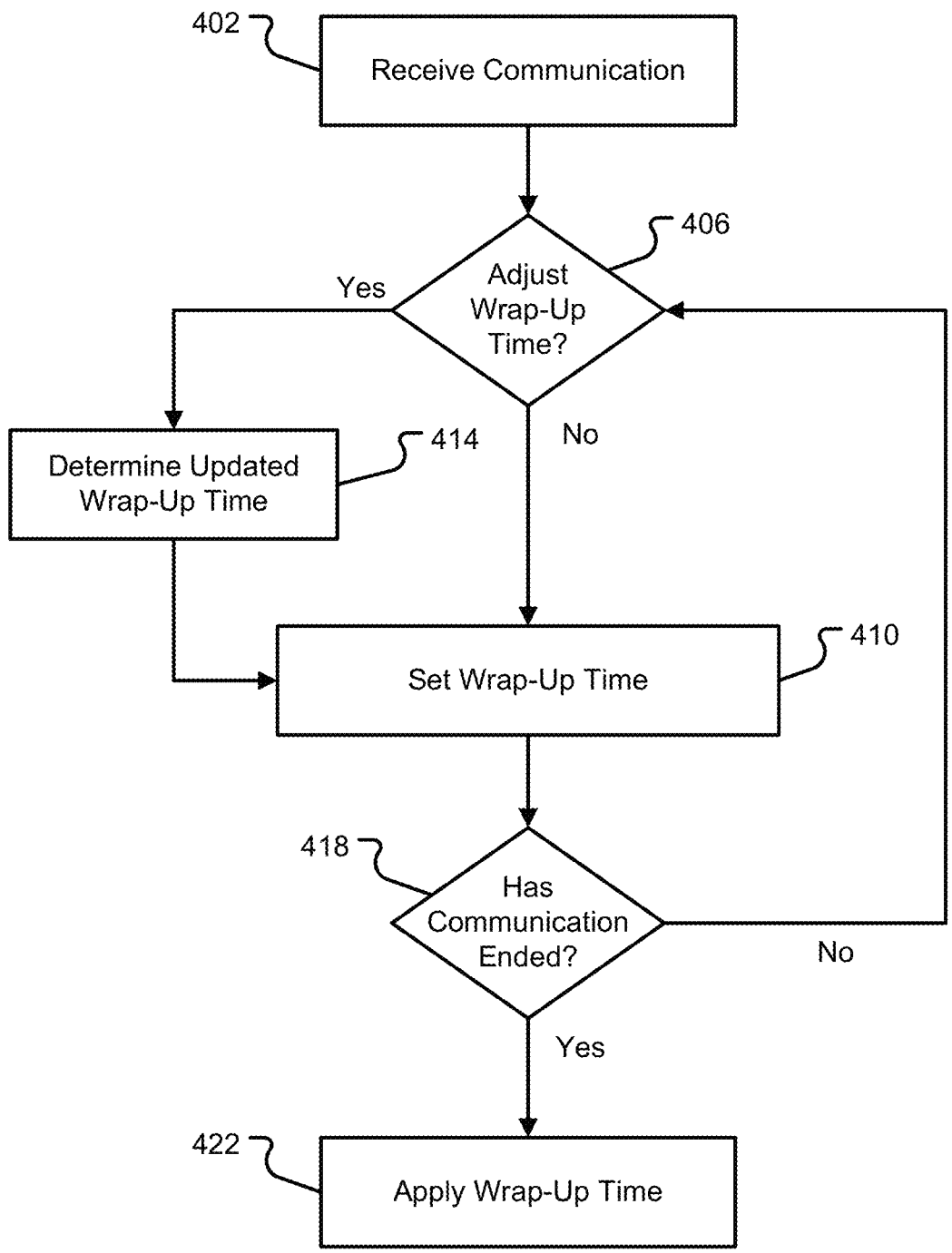
FIG. 4 is a flow diagram depicting a first method in accordance with at least some embodiments of the present disclosure.

Referring now to FIG. 4, a first communication method will be described in accordance with at least some embodiments of the present disclosure. The method begins when a communication is received at step 402. The communication may be from a user via a communication device (e.g., one or more of communication endpoints 101A-101N) and received in a contact center 120. The communication may be any type of communication described herein (e.g., text-based communication, chat communication, SMS communication, webcast communication, email communication, voice communication, video communication, etc.). In various embodiments, the communication can be received at a wrap-up engine 125 at a same time as, or after, it is received at the contact center 120.

It is determined if a wrap-up time should be adjusted at step 406. In various embodiments, an external system such as a wrap-up engine 125 can make this determination based on historical data (e.g., related to the contact center 120, one or more users, external information, etc.), communication inputs, current external or internal information, etc. If the wrap-up time is not being adjusted, then the method proceeds to step 410 and the wrap-up time is set. The wrap-up time may be set, in part, by storing the wrap-up time in a memory accessible by a component of the contact center 120, such as the wrap-up engine 125. Alternatively, the wrap-up time may be set by injecting a Wrap Up event to a bus of the contact center 120, where the bus publishes events related to the communication for other components of the contact center to digest and act upon. In other words, in some instances, the wrap-up time may be set by not submitting any event (e.g., to a call handler 121 of the contact center 120) so that a previously determined static wrap-up time remains in place. In other embodiments, the wrap-up time may be set by submitting an event to be published that contains a set wrap-up time for the communication that is not updated by the wrap-up engine 125.

If the wrap-up time is adjusted at step 406, then the method proceeds to determine the updated wrap-up time in step 414. For example, an external system, such as a wrap-up engine 125, may determine what information should be used to update the wrap-up time. Such a decision may be based on information related to the contact center 120, one or more users, external and/or internal information, communication inputs, etc. The updated wrap-up time may be determined by a system that is external or internal to the contact center 120, and may be the wrap-up engine 125 as described herein in combination with an API that creates the wrap-up event and publishes the wrap-up event on a bus of the contact center 120 as described herein.

As one example of an updated wrap-up time, an input received by the wrap-up engine 125 could be related to a rule in the contact center that limits the wrap-up time to a maximum wrap-up time. This could be a business rule sent inside of the contact center. So, if the wrap-up engine 125 judged a call to be highly emotional (e.g., based on sentiment data), then the wrap-up engine 125 could determine that an agent needs an updated-wrap up time that is an extended amount of time. The wrap-up engine 125 could then invoke an API to generate the event with the extended wrap-up time and the event would hit the component within the contact center 120 that manages the wrap-up time values. However, the business rules would be considered when the updated wrap-up time is implemented so that the wrap-up time would be limited to the maximum wrap-up time.

Once the updated wrap-up time is determined, the wrap-up time is set at step 410. The wrap-up time may be set, in part, by storing the wrap-up time in a memory accessible by a component of the contact center 120, such as the wrap-up engine. Alternatively, the wrap-up time may be set by injecting a Wrap Up event to a bus of the contact center 120, where the bus publishes events related to the communication for other components of the contact center to digest and act upon. In other words, the wrap-up time may be set by submitting an event (e.g., to a call handler 121 of the contact center 120) to be published that contains an updated wrap-up time for the communication.

The method may further determine whether the communication has ended at step 418. If the communication has not ended, the method may proceed back to step 406 to further determine whether the wrap-up time should be adjusted 406. To determine whether the wrap-up time should be adjusted at step 406, the considerations provided herein may be considered, together with any updated information that has occurred since the previous time that it was determined whether to adjust the wrap-up time at step 406. For example, there may be relevant external information, or new information about or within the communication and the contact center 120, to consider.

If the communication has ended at step 418, then the wrap-up time may be applied at step 422. For example, the wrap-up time may be applied by displaying the wrap-up time on a screen of the agent to convey the wrap-up time to the agent. The wrap-up time may be displayed during the communication, updated one or more times during the communication, and after the communication ends. The wrap-up time may count down after the communication ends to convey the passing of the wrap-up time to the agent.

Figure 5:
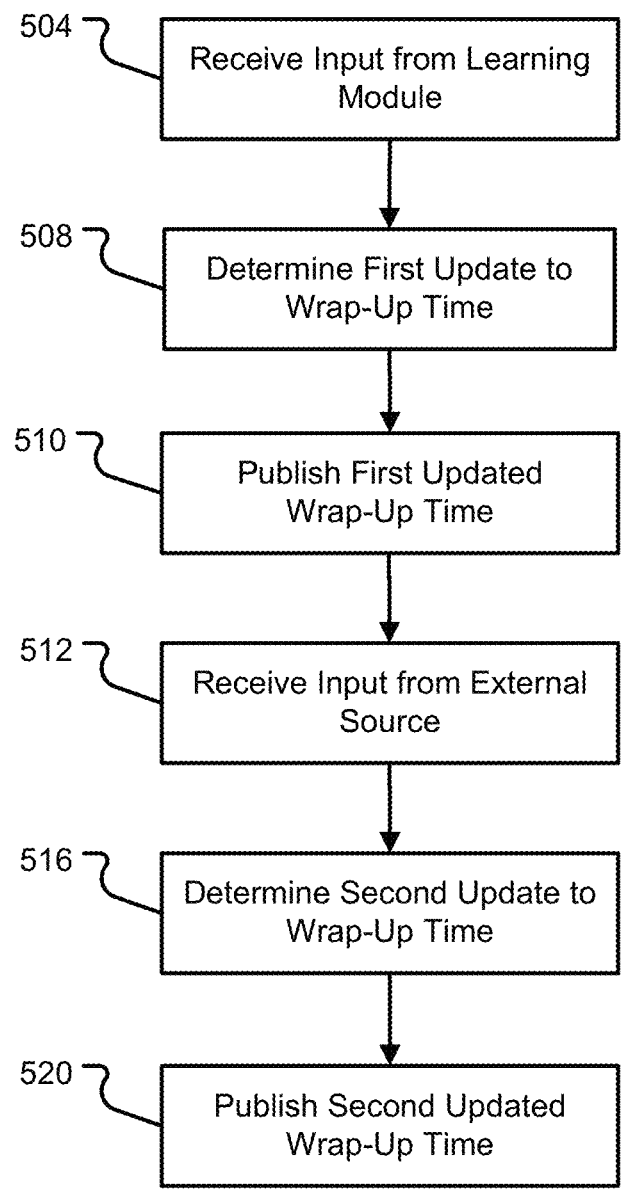
FIG. 5 is a flow diagram depicting a second method in accordance with at least some embodiments of the present disclosure.

Referring now to FIG. 5, a second communication method will be described in accordance with at least some embodiments of the present disclosure. The method begins when input is received from a learning module at step 504. The input may be received by a system that is internal to the contact center 120 or external to the contact center 120, such as the wrap-up engine 325. The input is related to a communication of the contact center 120. The input may be information that is based on various sources of information, including but not limited to training data and feedback 378, data model(s) 376, and information from wrap-up timing decision database 380. One or more of the various sources of information may have enabled the learning module to access and process the various sources of information so that the learning module can provide the input to the system.

At step 508, a first update to the wrap-up time is determined. This first update may be determined by a wrap-up timing engine 382 as described herein. The first update is to a wrap-up time of the communication from step 504 and the first update may be saved to memory and/or communicated to an API. The first updated wrap-up time may be published; for example, the API may process the information provided by a system (e.g., an external system such as the wrap-up engine 325) and communicate a first updated wrap-up time event to a bus of the contact center 120 to be published on the bus.

At step 512, input is received from one or more external sources. The input may be received by the same system as step 508, which may be the wrap-up engine 325. The input is related to the same communication as in step 504. The input may be information that is based on various external sources, including but not limited to social media network(s) 140, sentiment data 141, news feed(s) 142, and/or business rule(s) 143, etc.

Based upon the input from the external source in step 512, a second update to the wrap-up time for the communication is determined at step 516. The second update may be determined to be a same wrap-up time as previously determined or set for the communication, or a different amount of time for the wrap-up time for the communication. The second update may be saved to memory and/or communicated to the API. The second updated wrap-up time may be published; for example, the API may process the information provided by a system (e.g., an external system such as the wrap-up engine 325) and communicate the second updated wrap-up time event to a bus of the contact center 120 to be published on the bus. Thus, the second update to the warp-up time may be published at step 520.

Figure 6:
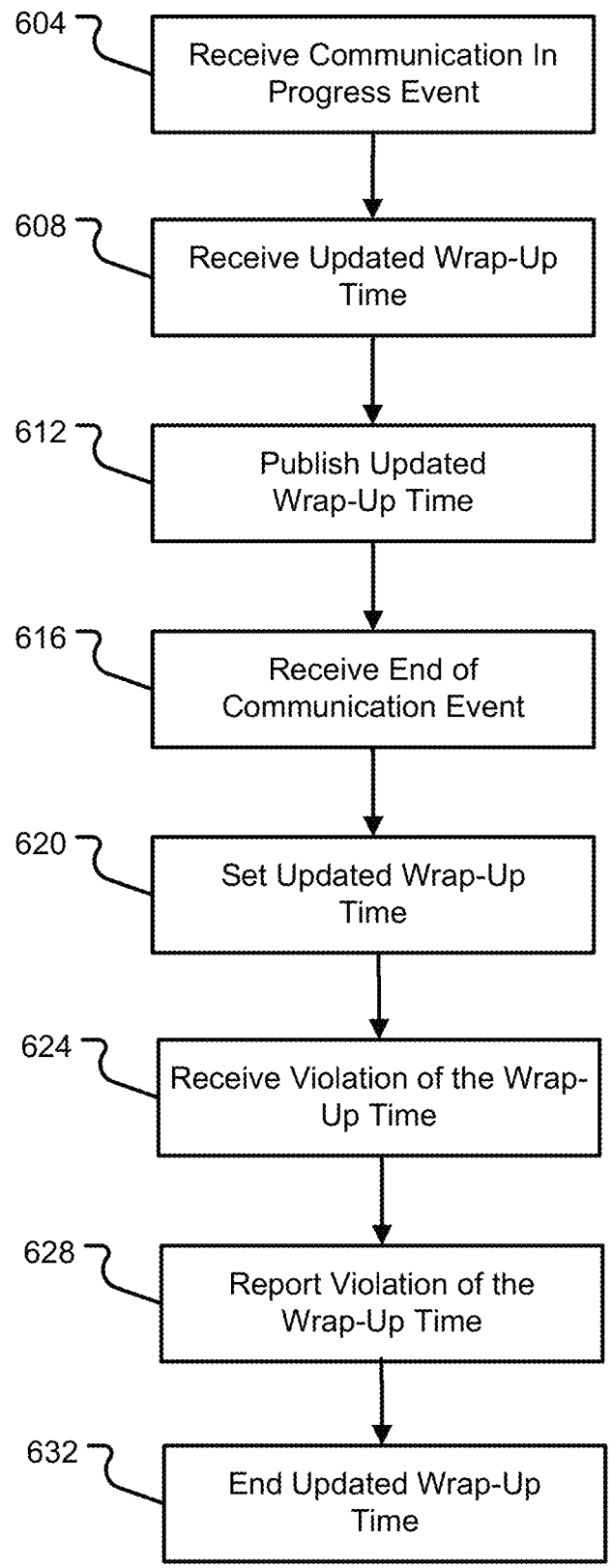
FIG. 6 is a flow diagram depicting a third method in accordance with at least some embodiments of the present disclosure.

Referring now to FIG. 6, a third communication method will be described in accordance with at least some embodiments of the present disclosure. The method begins when an event is received that a communication is in progress at step 604. The communication being in progress means that an agent has been connected to a customer of the contact center 120, and the agent and the customer are engaged in a communications session. The event may be published to a bus of the contact center 120.

An updated wrap-up time is received at step 608. The updated wrap-up time may be received by a wrap-up timing engine 380 from a learning module 374 and the updated wrap-up time is related to the communication session from step 604. The updated wrap up time is published at step 612. For example, the updated wrap-up time may be published to the bus of the contact center 120.

An end of communication event is received at step 616. This may be received as a published event on the bus, for example. The end of communication event may be digested by an application that also digests updated wrap-up time events and applies wrap-up times to communications. Thus, in step 620, the updated wrap-up time may be set (e.g., applied) to the communication. When the updated wrap-up time is set, it can be displaying as a time value to the agent handling the communication session. The time value can count down to provide the agent with a visual indication (e.g., a countdown) of the amount of time associated with the updated wrap-up time.

At step 624, a violation of the wrap-up time is received. The violation may occur when an agent pauses or exceeds the updated wrap-up time, which may be published as an event on the bus. The violation may be received by a system that is internal or external to the contact center, such as the wrap-up engine 325. For example, the violation may be provided to wrap-up/communication inputs 388 and then to wrap-up timing engine 382 where it is passed on to wrap-up timing decision database 380 and on to learning module 374. The violation may be processed by the learning module 374 in combination with other properties of the communication session, other communications sessions, and other information that is internal or external to the contact center 120, to be used in future determinations of wrap-up times in the contact center 120.

The violation of the updated wrap-up time is reported in step 628. For example, the violation may be reported to internal or external systems of the contact center 120 that track metrics related to the contact center 120. Also, the violation may be reported to a supervisor of the agent handling the communication session. The report, or properties of the report, may be provided to the wrap-up engine 325, such as an input to the wrap-up/communication inputs 388. At step 632, the updated wrap-up time ends.

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of managing a wrap-up time in a contact center, the method comprising:
    receiving, by an agent of the contact center, a communication having a variable associated with the communication;
    receiving an input from a source external to the contact center;
    determining that the variable is related to the input;
    based on the relation of the variable to the input, determining an updated wrap-up time;
    storing the updated wrap-up time and the input in a database comprising timing variables;
    enabling a machine learning process to analyze the database;
    providing the updated wrap-up time to the agent as an amount of time rendered on a display to the agent; and
    updating a data model used to automatically determine wrap-up times based on the analysis of the machine learning process.

2. The method of claim 1, further comprising:
    receiving input from the agent during the wrap-up time, wherein the receiving the input comprises at least one of storing a result and automatically reporting a result; and
    displaying an end of the updated wrap-up time to the agent.

3. The method of claim 1, wherein the input from the external source is received during the communication.

4. The method of claim 1, wherein the machine learning process retrieves data related to the variable from the timing variables database, and wherein the updated wrap-up time is based on the data.

5. The method of claim 1, wherein the machine learning process performs an analysis of a sentiment contained in the communication.

6. The method of claim 1, wherein the data model is used to automatically classify communications, and further comprising providing a second updated wrap-up time to an agent associated with a second communication based on the automatic classification and the input, wherein the second updated wrap-up time is a second amount of time rendered on the display to the agent.

7. The method of claim 1, wherein the variable changes during the communication and wherein the machine learning process performs the analysis over a timeframe that includes the changes in the variable.

8. The method of claim 1, wherein the updated wrap-up time is determined based on a rule of the contact center considered in combination with the analysis by the machine learning process.

9. The method of claim 1, further comprising:
    receiving a secondary input from a second source external to the contact center, wherein the second source is one of a news feed, a social media feed, and a business rule, and wherein the updated wrap-up time is determined by the machine learning process and based on both of the input and the secondary input.

10. The method of claim 1, wherein the machine learning process analyzes the database to obtain the input before a start of the communication.

11. A communication system, comprising:
    a processor; and
    computer memory storing data thereon that enables the processor to:
    receive, by an agent of the contact center, a communication having a variable associated with the communication;
    receive an input from a source external to the contact center;
    determine that the variable is related to the input;
    based on the relation of the variable to the input, determine an updated wrap-up time;
    store the updated wrap-up time and the input in a database comprising timing variables;
    enable a machine learning process to analyze the database;

provide the updated wrap-up time to the agent as an amount of time rendered on a display to the agent; and update a data model used to automatically determine wrap-up times based on the analysis of the machine learning process.

12. The communication system of claim 11, wherein the processor is further enabled to receive input from the agent during the wrap-up time, wherein the receiving the input comprises at least one of storing a result and automatically reporting a result.

13. The communication system of claim 11, wherein the input from the external source is received during the communication.

14. The communication system of claim 11, wherein the machine learning process retrieves data related to the variable from the timing variables database, and wherein the updated wrap-up time is based on the data.

15. The communication system of claim 11, wherein the machine learning process is further enabled to determine the updated wrap-up time based on a sentiment contained in the communication.

16. The communication system of claim 11, wherein the data model is used to automatically classify communications, and the processor is further enabled to provide a second updated wrap-up time to an agent associated with a second communication based on the automatic classification and the input.

17. The communication system of claim 11, wherein the processor is further enabled to invoke a reporting function when the updated wrap-up time is provided to the agent or when the data model is updated.

18. The communication system of claim 11, wherein the updated wrap-up time is determined based on a rule of the contact center considered in combination with the analysis by the machine learning process.

19. The communication system of claim 11, wherein the processor is further enabled to receive a secondary input from a second source external to the contact center, wherein the second source is one of a news feed, a social media feed, and a business rule, and wherein the updated wrap-up time is determined by the machine learning process and based on both of the input and the secondary input.

20. A contact center, comprising:

a server comprising a processor and a wrap-up timing engine that is executable by the processor and that enables the processor to:

receive, by an agent of the contact center, a communication having a variable associated with the communication;

receive an input from a source external to the contact center;

determine that the variable is related to the input;

based on the relation of the variable to the input, determine an updated wrap-up time;

store the updated wrap-up time and the input in a database comprising timing variables;

enable a machine learning process to analyze the database;

provide the updated wrap-up time to the agent as an amount of time rendered on a display to the agent; and update a data model used to automatically determine wrap-up times based on the analysis of the machine learning process.

* * * * *